United States Patent [19]
Schrenk et al.

[11] 3,743,459
[45] July 3, 1973

[54] APPARATUS FOR COEXTRUSION OF MULTILAYER SHEET OR FILMS

[75] Inventors: Walter J. Schrenk, Bay City; Lewis S. Mounts, Midland, both of Mich.

[73] Assignee: The Dow Chemical Company, Midland, Mich.

[22] Filed: May 19, 1971

[21] Appl. No.: 145,071

Related U.S. Application Data

[62] Division of Ser. No. 805,452, March 10, 1969, abandoned.

[52] U.S. Cl. .................................. 425/131, 425/462
[51] Int. Cl. ................................................. B29f 3/04
[58] Field of Search ........................... 425/131, 462; 264/171

[56] References Cited
UNITED STATES PATENTS

| | | | |
|---|---|---|---|
| 3,302,239 | 2/1967 | Senecal .............................. | 425/131 |
| 3,315,306 | 4/1967 | Cadner et al. ..................... | 425/131 |
| 3,464,087 | 9/1969 | Koch .................................. | 425/131 |
| 3,547,682 | 12/1970 | Erb .................................. | 425/131 X |

FOREIGN PATENTS OR APPLICATIONS

| | | | |
|---|---|---|---|
| 1,424,703 | 12/1965 | France | |
| 1,156,967 | 11/1963 | Germany ........................... | 425/380 |

*Primary Examiner*—R. Spencer Annear
*Attorney*—Griswold & Burdick

[57] ABSTRACT

This invention comprisea a multilayer laminated sheet for rigid packaging having an inner barrier laye r which is adhesively bonded to a polyolefin resin layer on one side and to a styrene polymer layer on the other side and a method and apparatus for making said laiminated sheet by coextrusion of all but the styrene polymer layer from a common die and immediately combing the resulting product with a styrene polumer sheet which is freshly extruded in tandem from a separate die. The invention further comprises a unique multilayer extrusion die configuration wherein a single thermoplastic substance is subdivided into layers of substantially equal thickness to the layers of other substances after which all of the layers are simultaneously united and extruded.

1 Claim, 4 Drawing Figures

PATENTED JUL 3 1973 3,743,459
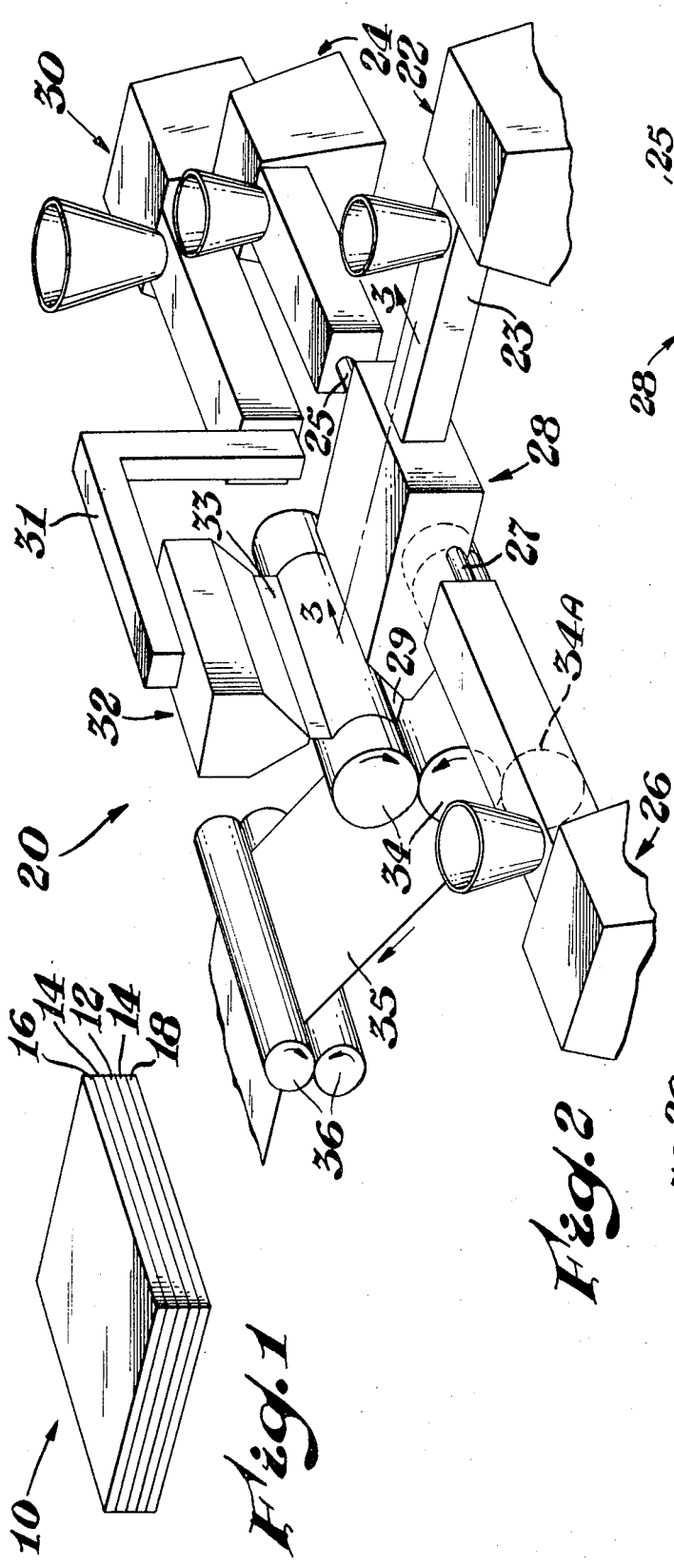
Fig.1
Fig.2
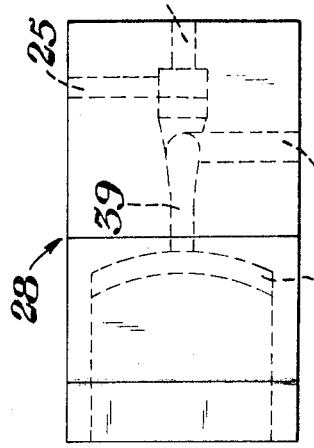
Fig.4
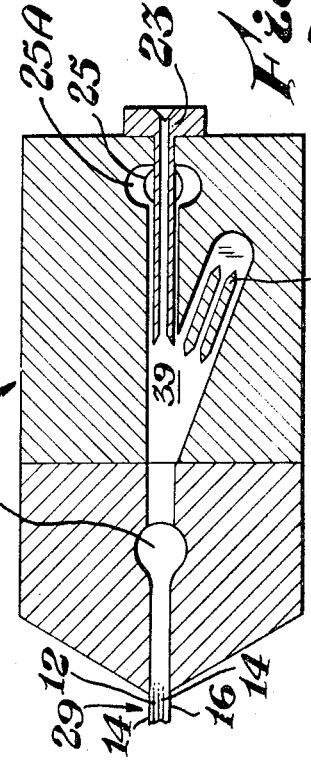
Fig.3

APPARATUS FOR COEXTRUSION OF MULTILAYER SHEET OR FILMS

This is a division of application, Ser. No. 805,452, filed Mar. 10, 1969 now abandoned.

When packaging butter, soft cheese, non-carbonated soft drinks, margarine and the like in plastic containers it is essential that the container have good barrier properties to moisture and oxygen. Further, the plastic material should not impart a taste or odor to the food product. In addition, the plastic material should be of low cost, good workability and low density.

In accordance with this invention these desiderata are obtained in a multilayered laminated sheet comprising an inner barrier layer which is adhesively bonded to a polyolefin resin layer on one side and to a styrene polymer layer on the other side. The invention also comprises a method and apparatus for making said laminated sheet by coextrusion of all but the styrene polymer layer from a common die and immediately combining the resulting product with styrene polymer sheet which is freshly extruded in tandem from a separate die. The invention further comprises a unique multilayer extrusion die configuration wherein a single thermoplastic substance is subdivided into layers of substantially equal thickness to the layers of other substances after which all of the layers are simultaneously united and extruded.

The invention is further understood by reference to the accompanying drawings wherein;

FIG. 1 is an isometric view of a laminated sheet in accordance with this invention;

FIG. 2 is a schematic view of the apparatus employed in the method of this invention;

FIG. 3 is a cross-section, taken along line 3—3, of one embodiment of die which may be employed in extruding the multilayer sheet of this invention; and FIG. 4 is a plan view of die 28 illustrating extruder and die passageways in hidden line.

Referring to FIG. 1, sheet 10 comprises barrier layer 12, adhesive layers 14, polyolefin layer 16 and styrene polymer layer 18.

A wide variety of barrier materials may be employed in the central layer of films in accordance with the present invention. Particularly suited as barrier layers are combinations of vinylidene chloride polymers, vinyl chloride polymers, vinylidene fluoride polymers and extrudable mixtures thereof. The requirement for the central layer is that the material be extrudable within a sheath of another polymer and that the composition have the desired gas and moisture vapor transmission barrier characteristics.

The barrier layer is advantageously from 0.2 to 5.0 mils in thickness and is most advantageously from 0.5 to 3.0 mils thick, and preferably about 1.0 mil thick.

The adhesive layer may vary in thickness from 0.2 to 1.0 mil, however, generally the preferred adhesive layer thickness is about 0.5 to 0.6 mil. Oftentimes the strength of the bond between the inner or core layer and the outer or surface layer increases slowly as the thickness of the adhesive layer is increased, and generally little or no increase in the bond strengths occurs after the thickness of the bonding layer has reached about 1.0 mil.

A wide variety of polymers and polymeric compositions are useful to increase the adhesion between the polyolefin outer layer and the inner barrier layer. Suitable polymers or polymeric compositions are readily selected by determining the bonding strength of the composition being evaluated by forming a two-layer extrusion. The bond strength of the two-layer laminate is readily determined by conventional peel strength tests.

Of great help in selecting the proper adhesive layer material are the solubility parameters or δ values. Solubility parameters or δ values are discussed in "Some Factors Affecting the Solubility of Polymers" by P. A. Small, Journal of Applied Chemistry, 3, 71 (1963) and also by Harry Burrell in the "Chemical Review,"14, 3–16, 31–46 (1955).

The polyolefin layer of the film may be prepared from a wide variety of polyolefin resins and is advantageously from 1 to 5 mils thick, preferably from 2 to 3 mils thick.

Referring now to FIG. 2, apparatus 20 comprises, in cooperative combination, a first extruder 22, a second extruder 24, a third extruder 26, a first die 28, a fourth extruder 30, a second die 32 and processing rolls 34. A first conduit 23 provides communication between the extruder 22 and the die 28. A second conduit 25 provides communication between the extruder 24 and the die 28. A third conduit 27 provides communication between the extruder 26 and the die 28. A composite, thermoplastic sheet or film 29 is shown issuing from the die 28.

A fourth conduit 31 provides communication between extruder 30 and die 32. A unitary thermoplastic sheet 33 is shown issuing from die 32. Sheets 29 and 33 are hot-combined and fed into the nip of processing rolls 34 and the combined sheet or film 35 is then passed between chill rolls 36 where the said sheet is cooled below its thermoplastic temperature. If desired, the sheet may be passed over additional hot processing rolls 34A before going to the chill rolls.

In FIG. 3 there is illustrated a cross-section of the die 28 taken along the line 3—3 of FIG. 2. The section depicts the interior construction of die 28 and illustrates a preferred embodiment of the apparatus of this invention whereby exceptionally uniform layers of the thermoplastic materials are obtained in the composite thermoplastic film. It has been found that in the coextrusion of multilayer films it is critical that each component layer be of substantially equivalent thickness before the layers are combined if the final product is to be uniform, i.e., have layers which are of substantially uniform thickness over their entire width. No problem is presented when it is desired that the final product have layers of about equal thickness, however it is often desirable that the final product comprise layers of differing thickness such as in the instant case where the polyolefin layers will generally be substantially thicker than either the barrier layer or the adhesive layers. In this instance it is necessary that the polyolefin layer be subdivided within the die so that the individual layers of polyolefin will approximate in thickness the thickness of the adhesive and barrier layers. This is accomplished in die 28 by baffles 37 which serve to divide the polyolefin stream into separate portions and allow the separate portions to recombine into a single stream simultaneously with combining with the adhesive and barrier layers. In this manner the sheet 29 contains layers of exceptional uniformity from edge to edge and there is very little waste material resulting from non-uniformities of layer thicknesses in the edge portions of the sheet.

Referring to FIG. 3, barrier layer 12 is provided to die 28 via conduit 23. Adhesive layers 14 are provided via conduit 25 and plenum 25A, whereby the barrier layer 12 is encapsulated with adhesive layers 14 upon entry into passageway 39. Simultaneously therewith, polyolefin layer 16, which has been previously subdivided by means of baffles 37 is recombined into a unitary layer and attached to one of the adhesive layers 14, after which the combined stream is passed to distribution manifold 38 where the stream is sheeted out to form composite film 29.

FIG. 4 depicts the relationship of conduits 23, 25 and 27 within die 28 and illustrates one arrangement for combining the three streams of thermoplastic material into a single composite cube-like stream and thereafter passing the composite stream to the distribution manifold 38.

By way of further example, a multilayer film is prepared by simultaneous extrusion and chill roll casting to form a multilayer film having as a polyolefin layer a copolymer of 95.5 weight percent propylene and 4.5 weight percent ethylene, having a thickness of 2.15 mils, adhered to an adhesive layer of a copolymer of 72 weight percent ethylene and 28 weight percent vinyl acetate having a thickness of 0.40 mil, which in turn is adhered to a 0.5 mil thick layer of a copolymer of 85 weight percent vinylidene chloride and 15 weight percent vinyl chloride formulated with 1 part per hundred tetrasodium pyrophosphate and 3 parts per hundred of a copolymer of 78 weight percent ethylene and 32 weight percent vinyl acetate. The vinylidene chloride-vinyl chloride layer in turn is adhered to an adhesive layer having a thickness of 0.4 mil of a copolymer of 72 weight percent ethylene and 28 weight percent vinyl acetate. The composite film has a thickness of 3.45 mils. Simultaneously with the coextrusion of the above film a 10 mil layer of a film of a high impact polystyrene comprising a copolymer of about 95 weight percent styrene and 5 weight percent polybutadiene is extruded, the two films are combined in the nip of a pair of hot rolls and the combined sheet is passed to chill rolls where it is cooled to below its thermoplastic temperature.

The resulting product is thermoformed into rigid containers wherein the polyolefin layer is on the inside and the styrene polymer layer is on the outside. The composite layer has a water-vapor transmission rate of 0.06 gms/100 in$^2$-day at 100° F. and 100 percent R.H. and an oxygen transmission rate of about 0.2 cc/100 in$^2$-24 hr. at atmospheric pressure and a density of about 62 lb/cu ft. The polyolefin inner layer is especially suitable for packaging foods and beverages as there is little or no tendency to impart tastes or odors to the packaged product.

Any unvulcanized natural or synthetic rubber which is soluble in monomeric styrene, or can be rendered soluble in styrene, e.g. by milling on compounding rolls, and contains at least one free olefinic linkage per two basic units in the rubber polymer molecule, may be used in making high impact styrene polymers which are useful in this invention. By basic unit is meant the radical making up the rubber molecule, which in the case of natural rubber is the isoprene radical $(C_5H_6)_n$ having in its combined form one olefinic linkage per isoprene radical. In the case of synthetic GRS type rubber, the basic unit is the radical corresponding to the conjugated olefin, e.g. butadiene, chemically combined in the rubber molecule. Polymers of styrene, acrylonitrile and butadiene constitute a preferred class for use in this invention.

Various modifications may be made in the present invention without departing from the spirit or scope thereof and it is understood that we limit ourselves only as defined in the appended claims.

We claim:

1. In a sheeting die adapted for the coextrusion of multilayer films comprising a first passageway, a second passageway coaxially arranged with said first passageway and forming a joint outlet therewith, and a third passageway in communication with the outlet of said first and second passageways the improvement which comprises baffles in said third passageway adapted to subdivide the material flowing through said third passageway to form layers which are of about the same thickness as the layers formed in said first and second passageways.

* * * * *